Figure 1:
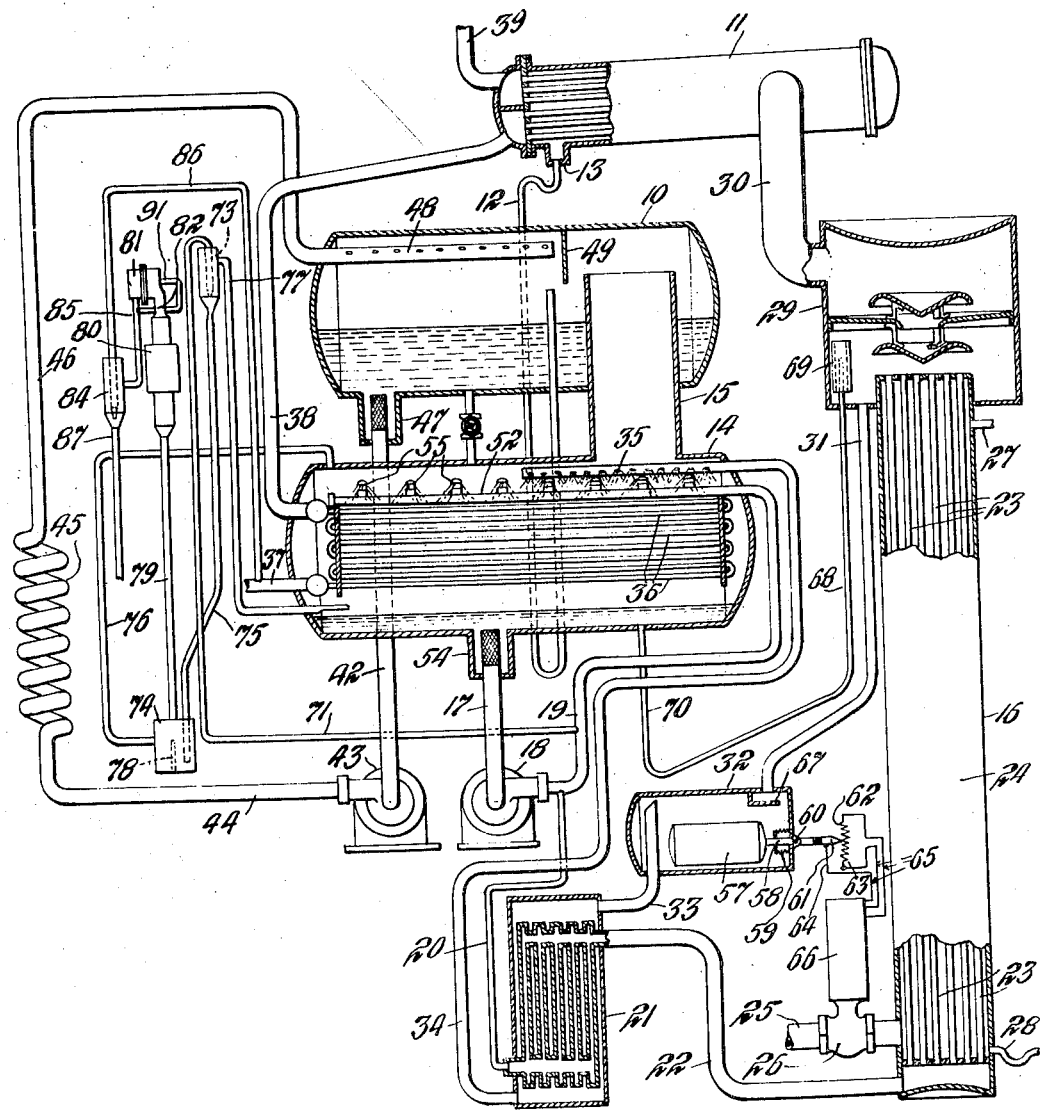

Patented Jan. 17, 1950

2,494,972

UNITED STATES PATENT OFFICE 2,494,972

ABSORPTION REFRIGERATION SYSTEM, INCLUDING A PURGE ARRANGEMENT

Albert R. Thomas, deceased, late of Evansville, Ind., by The National City Bank, administrator, Evansville, Ind., and Per Edberg, Evansville, Ind., assignors to Servel, Inc., New York, N. Y., a corporation of Delaware Application October 25, 1944, Serial No. 560,215

20 Claims. (Cl. 62—119)

The present invention relates to improvements in refrigeration systems and more particularly to apparatus for segregating and purging non-condensible gases from such systems.

While the present invention may be applied to other absorption refrigeration systems, it is particularly adapted for use in a system of the type illustrated and described in the application for United States Letters Patent of Albert R. Thomas, Serial No. 560,214, filed October 25, 1944, entitled "Refrigeration." Such a system operates in a partial vacuum and utilizes water as a refrigerant and a saline solution as an absorbent. The refrigerant and absorbent are introduced into the system as a water solution of a salt such as lithium chloride, lithium bromide or the like and the absorbent occurs in the system as a dilute or concentrated water solution of the salt. With such systems non-condensible gases may occur in the various elements of the system and they are transferred to and accumulate in the absorber. The accumulation of non-condensible gases in the absorber interferes with the proper operation of the system and must be purged therefrom.

One of the objects of the present invention is to provide a novel construction and arrangement of elements for purging non-condensible gases from an absorption refrigeration system of the type indicated.

Another object is to provide a purging means which prevents the flow of atmospheric air into the system and prevents the flow of absorption solution from the system.

Another object is to provide a check valve which permits the flow of non-condensible gases from a refrigeration system to the atmosphere while preventing the flow of atmospheric air into the system and to provide a float operated valve to prevent the flow of absorption liquid to the exhausting means.

Still another object of the invention is to provide an aspirator operated by recirculated absorption solution for transferring non-condensible gases from the refrigeration system to a storage vessel and a second water operated aspirator for transferring the non-condensible gases from the storage vessel to the atmosphere.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims. In the drawings, Fig. 1 is a diagrammatic view of an absorption refrigeration system incorporating the novel features of the present invention.

Figure 2:
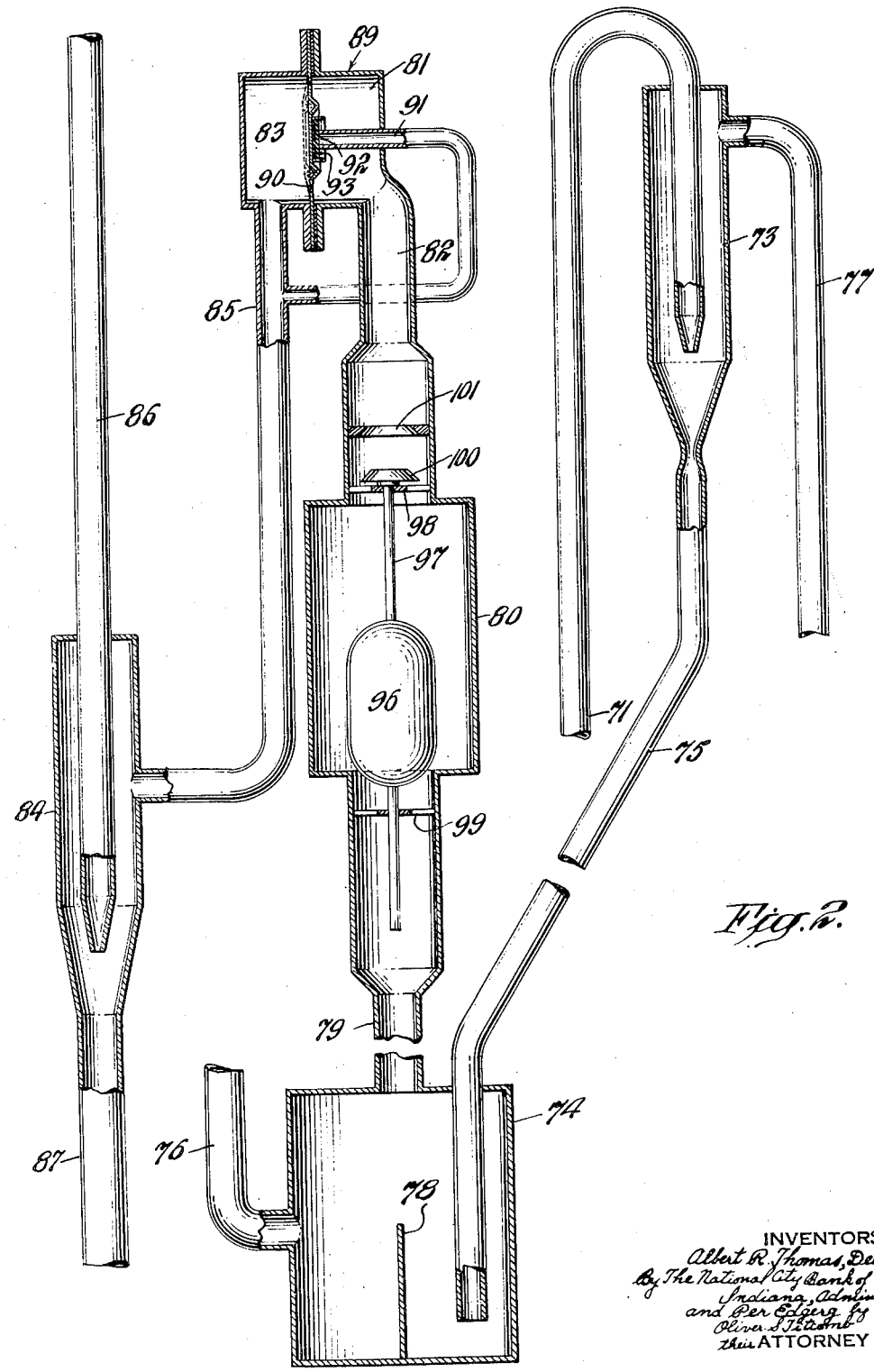

Fig. 2 is an enlarged diagrammatic view of the means for exhausting non-condensible gases from the system and shown with the pressure-operated check valve closed and the float-operated valve open.

In the absorption refrigeration system illustrated in Fig. 1 of the drawings the liquid refrigerant such as, for example, water is introduced into the evaporator 10 from a condenser 11 through a path of flow including a U-shaped tube 12. The evaporator 10 is in the form of a horizontal cylindrical drum and the U-shaped tube 12 has one end connected to a sump 13 at the bottom of the condenser 11 and its opposite end extending upwardly through the bottom of the evaporator. The refrigerant vapor formed in the evaporator 10 flows therefrom to an absorber 14 in which the vapor is absorbed into a liquid absorbent such as, for example, a concentrated water solution of lithium chloride or lithium bromide. The absorber 14 also is in the form of a horizontal cylindrical drum and is positioned directly below the evaporator 10. A pipe 15 extends upwardly from the top of the absorber 14 through the bottom of the evaporator 10 and for a considerable distance above the bottom to provide a stand-pipe in the evaporator. The stand-pipe 15 is adapted to exhaust refrigerant vapor from the evaporator 10 to the absorber 14 while maintaining a body of liquid refrigerant in the evaporator.

The absorption liquid enriched with refrigerant, or, in other words, the dilute salt solution, is conducted from the absorber 14 to the base of a generator 16 in a path of flow including conduit 17, pump 18, conduits 19 and 20, liquid heat exchanger 21, and conduit 22. Within the generator 16 are disposed a plurality of riser tubes 23 enclosed in a chamber formed by an outer shell 24 and to which steam is supplied through a conduit 25 from a suitable source of supply. The rate of flow of steam through conduit 25 is controlled by a modulating valve 26. Preferably the steam chamber in the generator 16 is provided with an outlet vent 27 adjacent its upper end and a condensate return line 28 adjacent the base thereof. The heating of the riser tubes 23 by the steam causes refrigerant vapor to be expelled from the absorption solution and such expelled vapor is effective to raise the absorption solution by gas or vapor-lift action.

The expelled vapor passes from the upper ends of the riser tubes 23 into the vapor separator 29 and thence flows through a conduit 30 to the condenser 11 where the vapor is liquefied. Liquid refrigerant formed in condenser 11 flows through the U-shaped tube 12 to the evaporator 10, as explained above, to complete the refrigeration cycle. The raised absorption solution from which refrigerant vapor has been expelled is conducted from the upper part of the generator 16 to the absorber 14 in a path of flow including a conduit 31, chamber 32, conduit 33, liquid heat exchanger 21, and conduit 34. The end of the conduit 34 extends into the absorber 14 in the upper portion thereof adjacent the inlet from the stand-pipe 15 and has a plurality of apertures or nozzles therein to provide a spray pipe 35 for dividing the absorption solution into a spray as it is introduced into the absorber to promote absorption of the refrigerant vapor. The heat liberated by the absorption of refrigerant vapor in absorber 14 is taken up by a cooling medium such as, for example, water, which flows upwardly through vertically disposed banks of pipes 36 in the absorber. The cooling water is introduced into the lower ends of the banks of pipes 36 from a supply main 37 and is discharged from the upper ends of the banks of pipes through a conduit 38. The conduit 38 is connected to condenser 11 so that the cooling water also may be utilized to effect cooling of the condenser. The cooling water is discharged from the condenser 11 through a conduit 39.

The system operates in a partial vacuum with generator 16 and condenser 11 operating at one pressure and evaporator 10 and absorber 14 operating at a lower pressure. The pressure differential between the high and low pressure sides of the system is maintained by a liquid column in the up-leg of the U-shaped tube 12 between the condenser 11 and evaporator 10. A similar liquid column is also present in the conduit 34 connecting the absorber 14 and heat exchanger 21. The pressure differential between the absorber 14 and generator 16 also is maintained by the pump 18 connected between the conduits 17 and 20.

The liquid refrigerant in the evaporator 10 is circulated continuously in a loop-circuit to adapt the system to refrigerate at a place remote from the evaporator. The loop-circuit comprises a conduit 42, pump 43, conduit 44, cooling element 45 and conduit 46. The conduit 42 has one end extending into a sump 47 at the bottom of the evaporator 10 to receive liquid refrigerant and its opposite end connected to the inlet to the pump 43. The conduit 44 is connected between the outlet from the pump 43 to the inlet of the cooling element 45 and the conduit 46 is connected between the outlet from the cooling element to the upper part of the evaporator 10. The cooling element 45 is illustrated diagrammatically as a cooling coil but it will be understood that this element may have other forms such as a radiator or the like depending upon the particular installation. As illustrated in Fig. 1 of the drawings the outlet end of the conduit 46 extends into the evaporator 10 and is provided with a series of apertures or nozzles to provide a spray pipe 48 for dividing the liquid refrigerant into a spray as it is returned to the evaporator to promote evaporation. Preferably a baffle plate 49 is provided in the evaporator 10 between the end of the spray pipe 48 and the stand-pipe 15 to prevent the liquid refrigerant from being swept into the stand-pipe with the refrigerant vapor.

The absorption solution in the absorber 14 also is circulated continuously through an auxiliary loop-circuit to promote absorption of the refrigerant vapor. The auxiliary loop-circuit for the absorption solution comprises the conduit 17, pump 18, and conduit 19. The upper end of the conduit 17 extends into a sump 54 in the bottom of the absorber 14 and the lower end of the conduit is connected to the intake of the pump 18. The conduit 19 is connected at one end to the outlet from the pump 18 and its opposite end 52 extends horizontally into the absorber 14 throughout substantially the entire length of the latter. The horizontally extending portion 52 of the conduit 19 is provided with a plurality of spray heads 55 each of which comprises a nozzle and a conical deflecting plate for dividing the absorption solution into a spray and distributing the spray over the banks of cooling pipes 36 to promote absorption of the refrigerant. During operation of the refrigeration system part of the circulating absorption solution is diverted from the conduit 19 through the conduit 20 and heat exchanger 21 to the generator 16 as previously described.

To prevent the progressive concentration of the absorption solution under certain conditions of operation and the crystallization and precipitation of salt resulting from such progressive concentration a control means is provided which is responsive to the concentration of the absorption solution and connected to adjust the valve 26 to regulate the amount of steam supplied to the generator 16. The control means may be located in any part of the refrigeration system where the progressive concentration of the absorption solution is likely to occur. As illustrated in Fig. 1 of the drawings the control means is located in the chamber 32 in the return line between the generator 16 and the heat exchanger 21. The control comprises a float 57 having a specific gravity such as to adapt it to rise when the concentration of the absorbent solution approaches a saturation point where salt will precipitate out of the solution. When the absorption solution is diluted sufficiently to prevent precipitation of salt the float 57 will fall by gravity in the absorption solution to the position illustrated in Fig. 1.

The concentration control float 57 has an arm 58 extending outwardly from the chamber 32 through a flexible bellows 59 to permit relative movement and the arm is pivoted at 60. The outer end of the arm 58 constitutes the movable contact 61 of a rheostat 62 connected by means of the electric circuit 65 to a servo-motor 66 for operating the steam control valve 26. The flexible bellows 59 acts as a load spring to cause the contact arm 61 to vary the resistance directly in response to variations in the concentration of the solution to modulate the valve 26. Preferably a baffle plate 67 is provided in the chamber 32 adjacent the end of the conduit 31 to prevent the velocity of the stream of incoming absorption solution from affecting the operation of the control float 57. The end of the conduit 33 extends upwardly in the chamber 32 above the float to insure immersion of the control float 57 by the absorption solution.

Preferably an overflow by-pass 68 is provided between the separating chamber 29 of the generator 16 and the bottom of the absorber 14. As illustrated in Fig. 1 of the drawings the upper end of the overflow by-pass 68 is protected by a baffle 69 and its opposite end is in the form of a vertical riser 70 to maintain a column of liquid absorbent for balancing the difference in pressure between the generator 16 and absorber 14.

In accordance with the present invention a portion of the absorption solution circulating in the auxiliary loop-circuit is utilized to withdraw non-condensible gases from the absorber 14. The absorption solution is diverted from the conduit 19 of the auxiliary loop-circuit through a conduit 71 to a Venturi tube 73 which, in turn, is connected to a separating chamber 74 by a conduit 75. A conduit 76 connects the separating chamber 74 to the top of the absorber 14. Connected to the Venturi-tube 73 adjacent its constricted throat is a conduit 77 having its opposite end extending into the absorber 14 to a position where the non-condensible gases accumulate. Due to the flow of the absorption fluid through the throat of the Venturi tube 73 the area adjacent the throat is evacuated which draws the non-condensible gases through the conduit 77. The non-condensible gases drawn into the Venturi-tube 73 are entrained in the absorption solution and carried into the separating chamber 74. As illustrated in the drawings a baffle plate 78 is provided in the separating chamber 74 to prevent the non-condensible gases from entering the conduit 76. Extending upwardly from the top of the separating chamber 74 is a conduit 79 which is connected at its upper end to a float chamber 80. The float chamber 80, in turn, is connected to one side 81 of a valve chamber by means of a connecting conduit 82. The opposite side 83 of the valve chamber is connected to a water operated aspirator 84 by means of a conduit 85. Water is supplied to the aspirator 84 from the supply main 37 through the pipe 86 and the water is discharged from the aspirator through a discharge tube 87.

Referring to Fig. 2 of the drawings a novel form of automatically operable check valve 89 is provided in the valve chamber for sealing the refrigeration system from the atmosphere. The check valve per se is claimed in a co-pending application for United States Letters Patent of Albert R. Thomas, Serial No. 560,216, filed October 25, 1944 and entitled Refrigeration. The check valve 89 comprises a flexible diaphragm 90 extending across the pressure chamber and a by-pass conduit or tube 91 extending from the side 81 to the conduit 85. The inner end 92 of the by-pass tube 91 is positioned adjacent the flexible diaphragm 90 and is adapted to be engaged by a resilient valve plate 93 of "Duprene" or the like carried by the diaphragm. The flexible diaphragm 90 normally engages the valve plate 93 with the end 92 of the by-pass 91 with a slight initial pressure to seal the side 81 of the valve chamber from the atmosphere. The side 83 of the valve chamber is subjected to the pressure in the conduit 85 to maintain the valve plate 93 engaged with the end 92 of the by-pass tube 91. Thus, if the pressure in the conduit 85 and side 83 of the valve chamber is greater than the pressure in the side 81 of the chamber of the valve plate 93 is firmly engaged with the end 92 of the by-pass tube 91 to seal the refrigeration system from the atmosphere. However, when the aspirator 84 evacuates the conduit 85 and side 83 of the valve chamber to a pressure below that prevailing in the side 81 of the chamber the diaphragm 90 will be flexed to the dash line position illustrated in Fig. 2 to open the end 92 of the by-pass tube 91 and permit the non-condensible gases to escape therethrough to the conduit 85.

As non-condensible gases are withdrawn from the side 81 of the pressure chamber, float chamber 80 and conduit 79, the absorption solution will rise in the conduit until it enters the float chamber. During normal operation of the system the absorption solution might enter the by-pass tube 91 and be discharged by the water-operated aspirator 84. To prevent such withdrawal of the absorption solution from the refrigeration system a float 96 is provided in the float chamber 80 having a stem 97 slidable in guides 98 and 99. At the upper end of the stem 97 is a valve 100 which cooperates with a valve seat 101 at the upper end of the float chamber. Thus, as the absorption solution rises in the conduit 79 it will raise the float 96 and valve 100 to engage it with the valve seat 101. One form of the invention having now been described in detail the mode of operation of the apparatus is as next explained.

For purposes of illustration let it be assumed that the system is not operating and the concentration control float 57 is in the position illustrated in Fig. 1 of the drawings. To initiate operation of the refrigeration system steam is supplied through the conduit 25 to the generator 16 and water is supplied from the main 37 to the cooling coils 36 in the absorber 14 and through the conduit 38 to the condenser 11. Simultaneously, operation of the pumps 18 and 43 is initiated to circulate refrigerant and absorption solution in their respective auxiliary loop-circuits. With the float 57 in the position illustrated in Fig. 1 the rheostat 62 will be adjusted to supply steam to the generator 16 for full load conditions. The steam in the generator 16 will vaporize water from the absorption solution standing in the riser tubes 23 and the water vapor will rise in the tubes to the vapor separating chamber 29 and raise the concentrated absorption solution by vapor lift action. In the chamber 29 the refrigerant vapor will be separated from the absorption liquid and will pass through the conduit 30 into the condenser 11 where the vapor will be liquefied by its contact with the relatively cold tubes therein. The liquefied refrigerant in the condenser 11 then will flow by gravity into the sump 13 and through the U-shaped tube 12 into the evaporator 10.

The liquid refrigerant delivered to the evaporator 10 will accumulate therein around the stand-pipe 15 and will be continuously circulated through the auxiliary loop-circuit by the pump 43. The refrigerant will be drawn from the evaporator through the conduit 42 to the pump 43 and will be delivered through the conduit 44 to the cooling element 45. The refrigerant leaving the cooling element 45 will be conducted through the conduit 46 back to the evaporator 10 where it will be sprayed through the nozzles in the spray pipe 48. During the passage of the liquid refrigerant through the cooling element 45 it will receive or pick up heat from the surrounding ambient such as a stream of air or a liquid to be cooled. Due to the pressure of the liquid refrigerant circulating in the auxiliary loop-circuit little if any evaporation will occur but instead the heat will be received as sensible heat and increase the temperature of the refrigerant. When the refrigerant is delivered to the evaporator 10 through the spray pipe 48 the low pressure prevailing therein will cause evaporation of a part of the refrigerant with a conversion of its sensible heat to latent heat of vaporization thereby reducing its temperature and the temperature of the body of refrigerant in the evaporator. Thus, the circulating refrigerant operates to absorb heat from the ambient surrounding the cooling element 45 which evaporates a portion of the refrigerant in the evaporator to reduce the temperature of the body of liquid refrigerant therein.

The refrigerant vapor in the evaporator 10 will flow through the stand-pipe 15 to the absorber 14. Simultaneously with the introduction of the refrigerant vapor into the absorber 14 the concentrated absorption solution in the vapor separating chamber 29 will flow through the conduit 31, chamber 32, conduit 33, heat exchanger 21, conduit 34, and spray pipe 35 which delivers it into the absorber adjacent the inlet pipe 15 as a spray. Thus, there will be an intimate mixture of the refrigerant vapor with the finely divided concentrated absorption solution. Due to the affinity of the concentrated absorption solution for the refrigerant vapor the latter will be absorbed in the solution. To promote absorption of the refrigerant vapor at a rapid rate the absorption solution is circulated in the loop-circuit comprising the conduit 17, pump 18, and conduit 19 which delivers the absorption solution back to the absorber through the plurality of spray heads 55 adjacent the top thereof. The heat of absorption will be transmitted through the coils 36 to the cooling water circulating therethrough. the rapid absorption of the refrigerant vapor in the absorber 14 will tend to reduce the pressure therein causing the refrigerant vapor in the evaporator 10 to be drawn through the stand-pipe 15. It will be observed that the circulation of the absorption solution through the auxiliary loop-circuit progressively promotes absorption of the refrigeration vapor to increase the efficiency of the absorber.

A portion of the absorption solution circulating in the auxiliary loop-circuit is diverted continuously through the conduit 20, heat exchanger 21 and conduit 22 to the base of the generator 16. The absorption solution flowing from the absorber 14 is comparatively cool while the concentrated absorption solution flowing from the vapor separator 29 to the absorber 14 is relatively hot. As these two streams of absorption solution pass each other during their flow through separate paths in the heat exchanger 21 the dilute solution flowing to the generator is heated by the concentrated solution flowing to the absorber which gives up its heat and becomes colder.

If during the operation of the refrigeration system an abnormal condition occurs such as the rapid vaporization of water from the absorption solution in the generator 16 without a corresponding evaporation of the refrigerant in the evaporator 10 the liquid refrigerant will accumulate in the evaporator and the concentration of the absorption solution in the rest of the system will increase progressively. If such a condition continues to the saturation point of the absorption solution salt will crystallize and precipitate out of the solution. Such a condition is undesirable as it may result in plugging the conduits and preventing the flow of the solution. As the concentration of the absorption solution flowing through the conduit 31 and chamber 32 increases, its specific gravity will increase proportionately until it is greater than the specific gravity of the control float 57. The control float 57 then will rise in the absorption liquid as controlled by the bellows 59 which acts as a load spring and will rock the arm 58 to adjust the rheostat 62. Such adjustment of the resistance of the rheostat 62 will cause the servo-motor 66 to be operated to adjust the steam valve 26 to decrease the amount of steam supplied to the generator. When the concentration of the absorption solution decreases, due to less steam being supplied to the generator 16, the float will fall to again vary the resistance of the rheostat 62 which, acting through the servo-motor 66, will open the steam valve 26. As the steam valve 26 is adjusted for any variation in the concentration of the absorption solution the concentration will be maintained substantially constant. Thus, the concentration control float 57 operates automatically to maintain a substantially constant concentration of the absorption solution at all times during the operation of the system.

A portion of the absorption solution circulating in the auxiliary loop-circuit will be fed continuously through the conduit 71 to the Venturi tube 73. The flow of absorption solution through the constricted throat of the Venturi tube 73 will evacuate the area adjacent the throat and withdraw non-condensible gases from the absorber 14 through the conduit 77. The non-condensible gases drawn into the Venturi tube 73 through the conduit 77 will be entrained in the absorption solution and delivered through the conduit 75 to the separating chamber 74, see Fig. 2. The absorption solution in the separating chamber 74 will flow through the conduit 76 back to the top of the absorber 14. As the point of connection of the conduit 76 with the separating chamber 74 is positioned above the lower end of the conduit 75 the non-condensible gases will bubble upwardly through the absorption solution which operates to strip any refrigerant therefrom. The non-condensible gases bubbling upwardly through the absorption liquid will accumulate in the riser tube or conduit 79, float chamber 80, conduit 82 and side 81 of the valve chamber and displace any absorption liquid therein.

The non-condensible gases will be withdrawn from the side 81 of the valve chamber by the water-operated aspirator 84. Water supplied to the aspirator 84 from the supply main 37 through the conduit 86 and passing through a constricted throat will evacuate the area adjacent the constricted throat including the conduit 85 and side 83 of the valve chamber. When the pressure in the side 83 is less than the pressure in the side 81 of the valve chamber, the flexible diaphragm 90 will be flexed from the full line position to the dash line position illustrated in Fig. 2 to withdraw the valve plate 93 from the end 92 of the by-pass tube 91. The non-condensible gases in the side 81 of the valve chamber then will flow from the system through the by-pass tube 91 to the conduit 85 and will be exhausted by the aspirator 84. If for any reason the pressure in the side 83 of the valve chamber increases above the pressure in the side 81 the resultant pressure on the flexible diaphragm 90 will flex it to the full line position illustrated in Fig. 2 to engage the valve plate 93 with the end 92 of the by-pass tube 91 and seal the refrigeration system from the atmosphere.

As the non-condensible gases are withdrawn from the side 81 of the pressure chamber, the absorption solution in the separating chamber 74 will rise in the conduit 79 until it enters the float chamber 80. The absorption solution in the float chamber 80 will lift the float 96 and operating through the stem 97 will engage valve 100 with the valve seat 101 to close the conduit 82. The valve 100 will remain engaged with the valve seat 101 until more of the non-condensible gas accumulates in the float chamber 80 and displaces the absorption liquid therein and permits the float to fall by gravity.

It will now be observed from the foregoing specification that the present invention provides a novel construction and arrangement of elements for purging non-condensible gases from an absorption refrigeration system. It also will be observed that the purging means prevents the flow of atmospheric air into the system and prevents the flow of absorption liquid from the system. It still further will be observed that the purging means provides for transferring non-condensible gases from the refrigeration system to a storage vessel and for transferring the gases from the storage vessel to the atmosphere.

While a preferred embodiment of the invention is herein shown and described as applied to a particular absorption refrigeration system, it will be apparent to those skilled in the art that the invention may be applied to other systems and that various modifications and changes may be made in the construction and arrangement of the parts without departing from the spirit or scope of the invention. Therefore, without limiting ourselves in this respect, we claim:

1. In an absorption refrigeration system having a plurality of elements including an absorber interconnected to provide a closed circuit for circulating refrigerant and absorption solution and in which non-condensible gases may accumulate, an auxiliary loop-circuit having a pump for continuously recirculating the absorption solution in the absorber, and a Venturi device connected to one of the elements of the system and utilizing absorption solution from the auxiliary loop-circuit for withdrawing non-condensible gases therefrom.

2. In an absorption refrigeration system having a plurality of interconnected elements to provide a closed circuit for circulating refrigerant and absorption solution and in which non-condensible gases may accumulate, an auxiliary loop-circuit having a pump for continuously recirculating the absorption solution, a Venturi tube, and a conduit connecting one of the elements of the system to the Venturi tube, said Venturi tube utilizing absorption solution from the auxiliary loop-circuit for withdrawing non-condensible gases from the element of the system through the conduit.

3. In an absorption refrigeration system having a plurality of interconnected elements to provide a closed circuit for circulating refrigerant and absorption solution and in which non-condensible gases may accumulate, an auxiliary loop-circuit having a pump for recirculating absorption solution, a Venturi tube connected to receive absorption solution from the loop-circuit, a conduit connecting one of the elements of the refrigeration system with the throat of the Venturi tube, and a riser tube for storing non-condensible gases, said Venturi tube utilizing absorption solution from the auxiliary loop-circuit to withdraw non-condensible gases from the system and transfer the gases to the riser tube.

4. In an absorption refrigeration system having a plurality of interconnected elements to provide a closed circuit for circulating refrigerant and absorption solution and in which non-condensible gases may accumulate, an auxiliary loop-circuit for recirculating absorption solution in the absorber, a Venturi tube connected to receive absorption solution from the auxiliary loop-circuit, a conduit connecting one of the elements of the refrigeration system to the Venturi tube, a riser tube for receiving and storing non-condensible gases, and a pump in the loop-circuit for circulating absorption solution through the Venturi tube to withdraw non-condensible gases from the element of the system and transfer the gases to the riser tube.

5. In an absorption refrigeration system having a plurality of interconnected elements to provide a closed circuit for circulating refrigerant and absorption solution and in which non-condensible gases may accumulate, an auxiliary loop-circuit for recirculating absorption solution in the absorber, a Venturi tube connected to receive absorption solution from the loop-circuit, a conduit connecting one of the elements of the refrigeration system to the Venturi tube, a separating chamber connected to the outlet from the Venturi tube, a riser tube connected to the separating chamber to receive and store non-condensible gases, and a pump for circulating absorption solution from the auxiliary loop-circuit through the Venturi tube to withdraw non-condensible gases from the element of the system through the conduit and separating chamber and transfer the gases to the riser tube.

6. In an absorption refrigeration system of the type having a plurality of interconnected elements to provide a closed circuit for circulating refrigerant and absorption solution and in which non-condensible gases may accumulate, an absorber in said circuit, an auxiliary loop-circuit for continuously recirculating the absorption solution in the absorber, a Venturi tube connected to receive absorption solution from the loop-circuit, a conduit connecting the absorber and Venturi tube, and a pump in the auxiliary loop-circuit for recirculating absorption solution through the Venturi tube to withdraw non-condensible gases from the absorber.

7. In an absorption refrigeration system of the type having a plurality of interconnected elements to provide a closed circuit for circulating refrigerant and absorption solution and in which non-condensible gases may accumulate, an absorber in said circuit, an auxiliary loop-circuit connected to the absorber, a Venturi tube connected to receive absorption solution from the loop-circuit, a conduit connecting the absorber and Venturi tube, a separating chamber connected to the outlet from the Venturi tube, and a pump in the loop-circuit for recirculating the absorption solution through the absorber and the Venturi tube to withdraw non-condensible gases from the absorber and transfer them to the separating chamber.

8. In an absorption refrigeration system of the type having a plurality of interconnected elements to provide a closed circuit for circulating refrigerant and absorption solution and in which non-condensible gases may accumulate, an evaporator in said circuit, an absorber in said circuit, an auxiliary loop-circuit including a cooling element for recirculating liquid refrigerant in the evaporator, a second auxiliary loop-circuit for recirculating absorption solution in the absorber, a Venturi tube connected to receive absorption solution from the second auxiliary loop-circuit, and a conduit connecting the absorber and Venturi tube, said Venturi tube utilizing the circulating absorption solution for withdrawing non-condensible gases from the absorber.

9. In an absorption refrigeration system of the type having a plurality of interconnected elements to provide a closed circuit for circulating refrigerant and absorption solution and in which non-condensible gases may accumulate, an evaporator in said circuit, an absorber in said circuit, an auxiliary loop-circuit including a pump and cooling element for recirculating liquid refrigerant in the evaporator, a second auxiliary loop-circuit including a pump for recirculating absorption solution in the absorber, a Venturi tube connected to receive absorption solution from the second auxiliary loop-circuit, a conduit connecting the absorber and Venturi tube, and a separating chamber connected to the outlet from the Venturi tube, said Venturi tube utilizing the circulating absorption solution for withdrawing non-condensible gases from the absorber and transferring them to the separating chamber.

10. In an absorption refrigeration system having a plurality of elements including an absorber interconnected to provide a closed circuit for circulating refrigerant and absorption solution and in which non-condensible gases may accumulate, an auxiliary loop-circuit connected to the absorber and including a pump for continuously recirculating absorption solution from the bottom to the top of the absorber, a separating chamber, Venturi means operated by absorption solution from the loop-circuit for withdrawing non-condensible gases from the absorber and transferring them to the separating chamber, and exhausting means connected to the separating chamber for withdrawing the gases from the system.

11. In an absorption refrigeration system of the type having a plurality of interconnected elements to provide a closed circuit for circulating refrigerant and absorption solution and in which non-condensible gases may accumulate, an absorber in said circuit, an auxiliary loop-circuit connected to the absorber for recirculating absorption solution, a Venturi tube connected to receive absorption solution from the loop-circuit, a conduit connecting one of the elements of the refrigeration system to the Venturi tube, a separating chamber connected to the outlet from the Venturi tube, said Venturi tube utilizing the circulating absorption solution for withdrawing non-condensible gases from the absorber and transferring them to the separating chamber, and exhausting means connected to the separating chamber to withdraw the gases from the system.

12. In an absorption refrigeration system of the type having a plurality of interconnected elements to provide a closed circuit for circulating refrigerant and absorption solution and in which non-condensible gases may accumulate, an absorber in said circuit, an auxiliary loop-circuit connected to the absorber and including a pump for circulating absorption solution therein, a Venturi tube connected to receive absorption solution from the loop-circuit, a conduit connecting one of the elements of the refrigeration system to the Venturi tube, a separating chamber connected to the outlet from the Venturi tube, said Venturi tube utilizing the circulating absorption solution for withdrawing non-condensible gases from the absorber and transferring them to the separating chamber, exhausting means connected to the separating chamber for withdrawing the gases, and a check valve between the separating chamber and exhausting means.

13. In an absorption refrigeration system of the type having a plurality of interconnected elements to provide a closed circuit for circulating refrigerant and absorption solution and in which non-condensible gases may accumulate, an absorber in said circuit, an auxiliary loop-circuit for recirculating absorption solution in the absorber, a Venturi tube connected to receive absorption solution from the loop-circuit, a conduit connecting one of the elements of the refrigeration system to the Venturi tube, a separating chamber connected to the outlet from the Venturi tube, said Venturi tube utilizing the circulating absorption solution for withdrawing non-condensible gases from the absorber and transferring them to the separating chamber, exhausting means connected to the separating chamber for withdrawing the gases, and a float valve between the exhausting means and separating chamber and operated by absorption solution in the latter.

14. In an absorption refrigeration system of the type having a plurality of interconnected elements to provide a closed circuit for circulating refrigerant and absorption solution and in which non-condensible gases may accumulate, an absorber in said circuit, an auxiliary loop circuit connected to the absorber for recirculating the absorption solution therein, a Venturi tube connected to receive absorption solution from the loop-circuit, a conduit connecting one of the elements of the refrigeration system to the Venturi tube, a separating chamber connected to the outlet from the Venturi tube, said Venturi tube utilizing the circulating absorption solution for withdrawing non-condensible gases from the system and transferring them to the separating chamber, exhausting means connected to the separating chamber for withdrawing the gases, a pressure-operated check valve between the separating chamber and exhausting means, and a float-operated valve between the check valve and chamber and operated by the absorption solution in the latter.

15. An absorption refrigeration system of the type which operates in a partial vacuum and in which non-condensible gases may accumulate, said system comprising a plurality of interconnected elements to provide a closed circuit for circulating refrigerant and absorption solution, exhausting means, a conduit connecting one of the elements of the system and the exhausting means and through which the non-condensible gases are exhausted from the element, a check valve in said conduit for closing the latter to prevent gases from entering the element, and a float valve in said conduit for closing the conduit upon a rise in the liquid level to prevent the withdrawal of any liquid from the system.

16. An absorption refrigeration system of the type which operates in a partial vacuum and in which non-condensible gases may accumulate, said system comprising a plurality of interconnected elements to provide a closed circuit for circulating refrigerant and absorption solution, a water operated aspirator, a conduit connecting one of the elements of the system and the aspirator for withdrawing non-condensible gases from the element, a check valve for opening or closing the conduit, a flexible impervious diaphragm operable by the difference in pressure at opposite sides of the valve and connected to operate the latter, and a float valve in said conduit operable by a rise in the level of the absorption solution to close the conduit.

17. An absorption refrigeration system of the type which operates in a partial vacuum and in which non-condensible gases may accumulate, said system comprising a plurality of interconnected elements to provide a closed circuit for circulating refrigerant and absorption solution, a riser tube connected to the refrigeration system, means for transferring non-condensible gases to the riser tube where they accumulate, exhausting means connected to the riser tube to withdraw the gases therefrom, a check valve between the riser tube and exhausting means and operated by the difference in pressure at the opposite sides thereof, said absorption solution in the refrigeration system entering the riser tube when the gases are withdrawn, and a float valve in said riser tube operated by a rise in the level of the absorption solution for closing the tube.

18. An absorption refrigeration system of the type which operates in a partial vacuum and in which non-condensible gases may accumulate, said system comprising a plurality of interconnected elements to provide a closed circuit for circulating refrigerant and absorption solution, an absorber in said circuit, a separating chamber, means connecting the absorber and chamber and utilizing absorption solution for transferring non-condensible gases from the absorber to the chamber, said chamber separating the absorption solution from the non-condensible gases, a riser tube connected to the chamber for receiving the non-condensible gases, exhausting means connected to the riser tube for withdrawing the gases therefrom, a check valve in the riser tube operated by the difference in pressure at the opposite sides thereof, said absorption solution rising in the riser tube when the non-condensible gases are withdrawn, and a float valve in the riser tube operated by a rise in the level of the absorption solution for closing the tube.

19. In an absorption refrigeration system in which non-condensible gases may accumulate and having a plurality of elements interconnected to provide main circuits for the circulation of refrigerant and absorption solution, an auxiliary loop-circuit connected to one of the main circuits and comprising a Venturi tube connected to one of the elements of the refrigeration system and a separating vessel for separating gas from liquid and segregating the gas, and a pump for circulating liquid from the main circuit through the auxiliary loop-circuit and back to said main circuit, and said Venturi tube utilizing the flow of liquid therethrough for withdrawing non-condensible gases from the element to which it is connected and transferring the gases to the separating vessel to segregate the gases.

20. In an absorption refrigeration system in which non-condensible gases may accumulate and comprising a plurality of elements interconnected to provide main circuits for the circulation of refrigerant and absorption solution, an auxiliary loop-circuit connected to the main absorption solution circuit and comprising a Venturi tube connected to one of the elements of the refrigeration system and a separating vessel for separating gas from liquid and segregating the gas, and a pump for circulating absorption liquid from the main circuit through the auxiliary loop-circuit and back to said main circuit, and said Venturi tube utilizing the flow of liquid therethrough for withdrawing non-condensible gases from the element to which it is connected and transferring the gases to the separating vessel to segregate the gases.

THE NATIONAL CITY BANK,
By JOHN N. EMIG,
Vice President,
Administrator of the Estate of Albert R. Thomas, Deceased.

PER EDBERG.

REFERENCES CITED

The following references are of record in the file of this patent:

UNITED STATES PATENTS

| Number | Name | Date |
|---|---|---|
| 1,909,076 | Schlumbohm | May 16, 1933 |
| 2,344,245 | Grossman | Mar. 14, 1944 |

FOREIGN PATENTS

| Number | Country | Date |
|---|---|---|
| 22,963 | Great Britain | Oct. 17, 1906 |